US008727990B2

(12) United States Patent
Kim et al.

(10) Patent No.: US 8,727,990 B2
(45) Date of Patent: May 20, 2014

(54) PROVIDING AN ULTRASOUND SPATIAL COMPOUND IMAGE IN AN ULTRASOUND SYSTEM (75) Inventors: Jeong Sik Kim, Seoul (KR); Jae Keun Lee, Seoul (KR)

(73) Assignee: Samsung Medison Co., Ltd., Kangwon-do (KR)

( * ) Notice: Subject to any disclaimer, the term of this patent is extended or adjusted under 35 U.S.C. 154(b) by 290 days.

(21) Appl. No.: 12/882,902

(22) Filed: Sep. 15, 2010

(65) Prior Publication Data

US 2011/0118604 A1 May 19, 2011

(30) Foreign Application Priority Data

Nov. 19, 2009 (KR) ........................ 10-2009-0111747

(51) Int. Cl.
*A61B 8/00* (2006.01)
(52) U.S. Cl.
USPC ......................................................... 600/443
(58) Field of Classification Search
USPC ......................................................... 600/443
See application file for complete search history.

(56) References Cited

U.S. PATENT DOCUMENTS

| 5,879,303 | A  | * | 3/1999  | Averkiou et al. ............... 600/447 |
| 6,224,552 | B1 | * | 5/2001  | Jago et al. ...................... 600/437 |
| 6,458,083 | B1 | * | 10/2002 | Jago et al. ...................... 600/443 |
| 6,527,720 | B1 | * | 3/2003  | Ustuner et al. ................. 600/443 |
| 6,554,770 | B1 |   | 4/2003  | Sumanaweera et al. |
| 7,766,835 | B2 |   | 8/2010  | Lee et al. |
| 2002/0120195 | A1 | * | 8/2002 | Hossack et al. ................ 600/443 |
| 2003/0097068 | A1 | * | 5/2003 | Hossack et al. ................ 600/443 |
| 2007/0276243 | A1 |   | 11/2007 | Gerard et al. |
| 2009/0088638 | A1 |   | 4/2009  | Sato et al. |
| 2009/0171208 | A1 |   | 7/2009  | Osumi et al. |
| 2010/0004540 | A1 |   | 1/2010  | Thiele |

FOREIGN PATENT DOCUMENTS

| EP | 1 757 954 A2   | 2/2007 |
| JP | 10-179589 A    | 7/1998 |
| JP | 2002-011004 A  | 1/2002 |
| JP | 2002-526224 A  | 8/2002 |

(Continued)

OTHER PUBLICATIONS

Cincotti, "Frequency Decomposition and Compounding of Ultrasound Medical Images with Wavelet Packets", IEEE Transactions on Medical Imaging, vol. 20, No. 8, Aug. 2001.*

(Continued)

*Primary Examiner* — Jonathan Cwern
(74) *Attorney, Agent, or Firm* — McDermott Will & Emery LLP (57) ABSTRACT

An ultrasound system includes an ultrasound data acquisition unit and a processing unit. The ultrasound data acquisition unit transmits and receives ultrasound signals to and from a target object based on a plurality of steering angles to output a plurality of ultrasound data for obtaining a plurality of ultrasound images corresponding to the steering angles. The processing unit forms the ultrasound images based on the ultrasound data, decomposes each of the ultrasound images into a low pass image having a low frequency component and a high pass image having a high frequency component, performs a blending process of removing a seam artifact upon the low and high pass images for each of the ultrasound images, forms a plurality of restoration images by composing the blended low and high pass images, and forms an ultrasound spatial compound image based on the restoration images.

11 Claims, 5 Drawing Sheets

(56) References Cited

FOREIGN PATENT DOCUMENTS

| | | |
|---|---|---|
| JP | 2002-526229 | 8/2002 |
| JP | 2004-290393 | 10/2004 |
| JP | 2005-120359 | 5/2005 |
| JP | 2007-515242 A | 6/2007 |
| JP | 2007-236740 A | 9/2007 |
| JP | 2009-082469 A | 4/2009 |
| JP | 2009-153918 | 7/2009 |
| JP | 2010-508881 A | 3/2010 |
| KR | 10-2008-0025903 | 3/2008 |
| WO | WO 00/20889 | 4/2000 |

OTHER PUBLICATIONS

Korean Office Action, issued in Korean Patent Application No. 10-2009-0111747, dated Oct. 31, 2011.

Choi et al., "Method for Suppressing Seam Line Artifact in Spatially Compounded Ultrasonic Diagnostic Images," Proceedings of the Fifth IASTED International Conference, Biomedical Engineering, Innsbruck, Austria, pp. 192-196 (Feb. 14-16, 2007).

Extended European Search Report issued in European Patent Application No. EP 10175431.5 dated Jul. 5, 2013.

M.H. Choi "Suppression of Gradient Across Seam Line Using a Smoothing Filter in Spatially Compounded Ultrasonic Diagnostic Images," Proceedings of the 29th Annual International Conference of the IEEE EMBS, Aug. 23-26, 2007.

Japanese Office Action issued in Japanese Application No. 2010-250088 mailed Mar. 4, 2014, with English translation.

* cited by examiner

PROVIDING AN ULTRASOUND SPATIAL COMPOUND IMAGE IN AN ULTRASOUND SYSTEM

CROSS-REFERENCE TO RELATED APPLICATIONS

The present application claims priority from Korean Patent Application No. 10-2009-0111747 filed on Nov. 19, 2009, the entire subject matter of which is incorporated herein by reference.

TECHNICAL FIELD

The present disclosure generally relates to ultrasound systems, and more particularly to providing an ultrasound spatial compound image in an ultrasound system.

BACKGROUND

An ultrasound system has become an important and popular diagnostic tool since it has a wide range of applications. Specifically, due to its non-invasive and non-destructive nature, the ultrasound system has been extensively used in the medical profession. Modern high-performance ultrasound systems and techniques are commonly used to produce two or three-dimensional diagnostic images of internal features of an object (e.g., human organs).

The ultrasound system transmits and receives ultrasound signals to and from a target object to thereby form a 2D (two-dimensional) ultrasound image or a 3D (three-dimensional) ultrasound image. Various techniques have been analyzed to enhance resolution of the ultrasound image. Spatial compounding is one of such techniques.

Spatial compounding is an imaging technique for forming a single compounding image by combining ultrasound images obtained from multiple points and angles. That is, the ultrasound system electronically steers scan-lines at different steering angles to thereby form a plurality of ultrasound images. The ultrasound system may then compound the ultrasound image to form an ultrasound spatial compound image.

Border lines of the ultrasound images are represented on the ultrasound spatial compound image. That is, a seam artifact occurs when the ultrasound spatial compound image is formed by compounding the ultrasound images. Thus, there is a problem in that the quality of the ultrasound spatial compound image becomes poor.

SUMMARY

Embodiments for providing a plurality of slice images in an ultrasound system are disclosed herein. In one embodiment, by way of non-limiting example, an ultrasound system comprises: an ultrasound data acquisition unit configured to transmit and receive ultrasound signals to and from a target object based on a plurality of steering angles to thereby output a plurality of ultrasound data for obtaining a plurality of ultrasound images corresponding to the plurality of steering angles; and a processing unit in communication with the ultrasound data acquisition unit, the processing unit being configured to form the plurality of ultrasound images based on the plurality of ultrasound data, decompose each of the ultrasound images into a low pass image having a low frequency component and a high pass image having a high frequency component, perform a blending process for removing a seam artifact upon the low pass image and the high pass image for each of the ultrasound images, form a plurality of restoration images by composing the blended low pass image and the high pass image, and form an ultrasound spatial compound image based on the plurality of restoration images.

In another embodiment, there is provided a method of providing an ultrasound spatial compound image comprising: a) forming a plurality of ultrasound images based on a plurality of ultrasound data, wherein the plurality of ultrasound images correspond to a plurality of steering angles; b) decomposing each of the ultrasound images into a low pass image having a low frequency component and a high pass image having a high frequency component; c) performing a blending process of removing a seam artifact upon the low pass image and the high pass image for each of the ultrasound images; d) forming a plurality of restoration images by composing the blended low pass image and the high pass image; and e) forming an ultrasound spatial compound image based on the plurality of restoration images.

In yet another embodiment, there is provided a computer readable medium comprising computer executable instructions configured to perform the following acts: a) forming a plurality of ultrasound images based on a plurality of ultrasound data, wherein the plurality of ultrasound images correspond to a plurality of steering angles; b) decomposing each of the ultrasound images into a low pass image having a low frequency component and a high pass image having a high frequency component; c) performing a blending process of removing a seam artifact upon the low pass image and the high pass image for each of the ultrasound images; d) forming a plurality of restoration images by composing the blended low pass image and the high pass image; and e) forming an ultrasound spatial compound image based on the plurality of restoration images.

The Summary is provided to introduce a selection of concepts in a simplified form that are further described below in the Detailed Description. This Summary is not intended to identify key or essential features of the claimed subject matter, nor is it intended to be used in determining the scope of the claimed subject matter.

DETAILED DESCRIPTION

A detailed description may be provided with reference to the accompanying drawings. One of ordinary skill in the art may realize that the following description is illustrative only and is not in any way limiting. Other embodiments of the present invention may readily suggest themselves to such skilled persons having the benefit of this disclosure.

Figure 1:
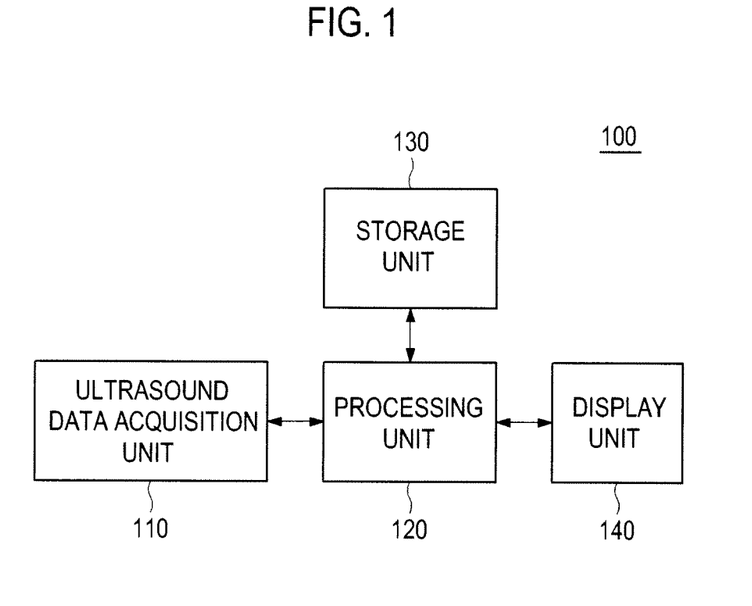
FIG. 1 is a block diagram showing an illustrative embodiment of an ultrasound system.

Referring to FIG. 1, an ultrasound system 100 in accordance with an illustrative embodiment is shown. As depicted therein, the ultrasound system 100 may include an ultrasound data acquisition unit 110. The ultrasound data acquisition unit 110 may be configured to transmit and receive ultrasound signals to and from a target object to thereby output ultrasound data.

Figure 2:
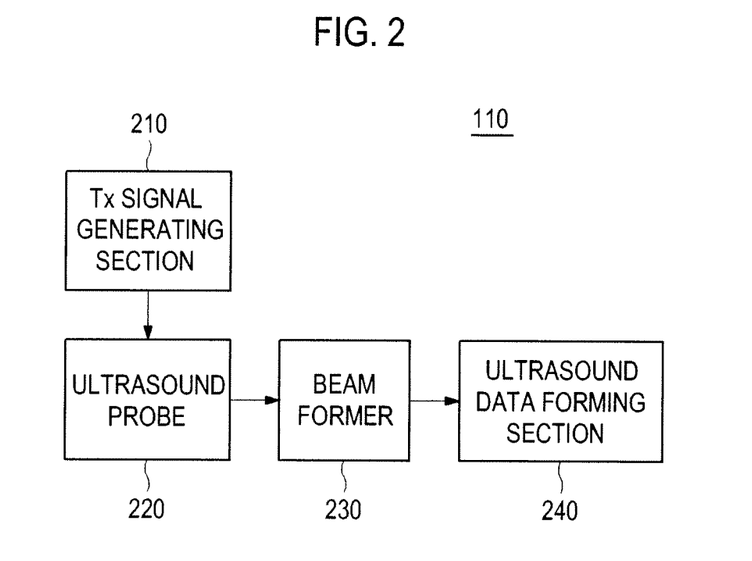
FIG. 2 is a block diagram showing an illustrative embodiment of an ultrasound data acquisition unit.

FIG. 2 is a block diagram showing an illustrative embodiment of the ultrasound data acquisition unit 110. Referring to FIG. 2, the ultrasound data acquisition unit 110 may include a transmit (Tx) signal generating section 210, an ultrasound probe 220, a beam former 230 and an ultrasound data forming section 240.

The Tx signal generating section 210 may be configured to generate Tx signals. In one embodiment, the Tx signal generating section 210 may generate a plurality of Tx signals with different Tx patterns such that scan-lines are steered at different steering angles. Thus, a plurality of ultrasound images corresponding to the respective steering angles may be obtained. The ultrasound image may include a brightness mode (B mode) image. However, it should be noted herein that the ultrasound image may not be limited thereto.

Figure 3:
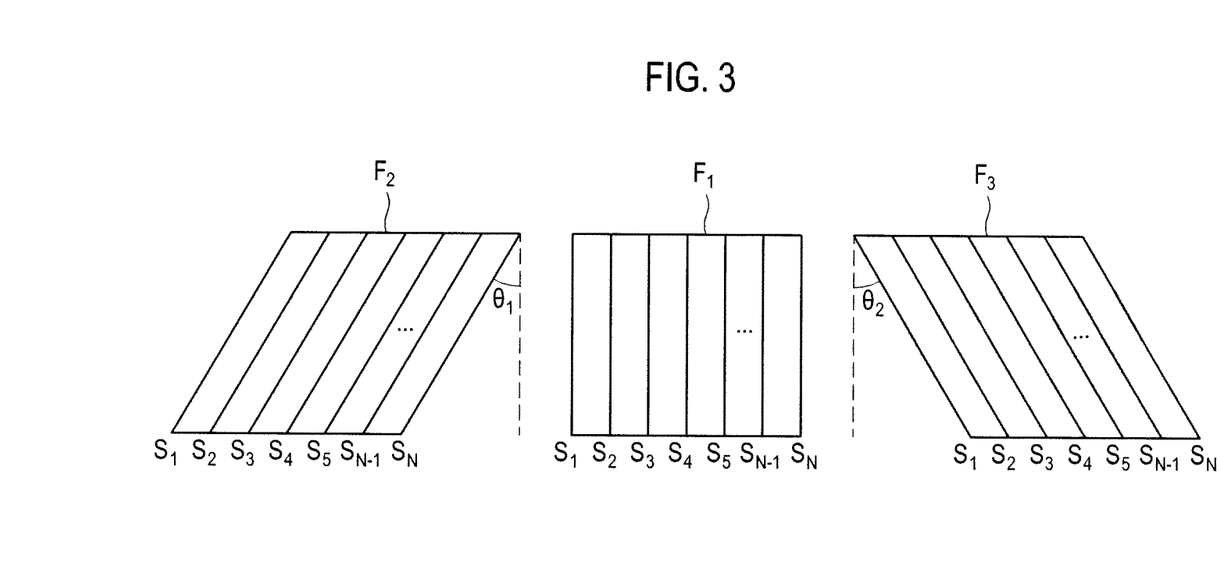
FIG. 3 is a schematic diagram showing an example of a plurality of steering angles and a plurality of ultrasound images corresponding to the plurality of steering angles.

FIG. 3 is a schematic diagram showing an example of a plurality of steering angles and the plurality of ultrasound images corresponding to the plurality of steering angles. Referring to FIG. 3, the Tx signal generating section 210, as shown in FIG. 2, may generate first Tx signals for obtaining a first ultrasound image $F_1$, where the scan-lines $S_1$ to $S_N$ are not steered, second Tx signals for obtaining a second ultrasound image $F_2$, where the scan-lines $S_1$ to $S_N$ are electronically steered at a steering angle $\theta_1$, and third Tx signals for obtaining a third ultrasound image $F_3$, where the scan-lines $S_1$ to $S_N$ are electronically steered at a steering angle $\theta_2$.

Referring back to FIG. 2, the ultrasound probe 220 may include a plurality of elements (not shown) for reciprocally converting between ultrasound signals and electrical signals. The ultrasound probe 220 may be configured to transmit ultrasound signals into the target object in response to the Tx signals provided from the Tx signal generating section 210. The ultrasound probe 220 may further receive ultrasound echo signals reflected from the target object to thereby form received signals. The received signals may be analog signals.

In one embodiment, the ultrasound probe 220 may transmit ultrasound signals to the target object in response to the first Tx signals provided from the Tx signal generation section 210. The ultrasound probe 220 may further receive ultrasound echo signals reflected from the target object to thereby form first received signals. The ultrasound probe 220 may further transmit ultrasound signals to the target object in response to the second Tx signals provided from the Tx signal generation section 210. The ultrasound probe 220 may receive ultrasound echo signals reflected from the target object to thereby form second received signals. The ultrasound probe 220 may further transmit ultrasound signals to the target object in response to the third Tx signals provided from the Tx signal generation section 210. The ultrasound probe 220 may further receive ultrasound echo signals reflected from the target object to thereby form third received signals.

The beam former 230 may be configured to convert the received signals into digital signals. The beam former 230 may further apply delays to the digital signals in consideration of focal points and distance between the elements to thereby form digital receive-focused signals.

In one embodiment, the beam former 230 may convert the first received signals provided from the ultrasound probe 220 into first digital signals. The beam former 230 may further apply delays to the first digital signals in consideration of focal points and distance between the elements to thereby form first digital receive-focused signals. The beam former 230 may further convert the second received signals provided from the ultrasound probe 220 into second digital signals. The beam former 230 may further apply delays to the second digital signals in consideration of focal points and distance between the elements to thereby form second digital receive-focused signals. The beam former 230 may further convert the third received signals provided from the ultrasound probe 220 into third digital signals. The beam former 230 may further apply delays to the third digital signals in consideration of focal points and distance between the elements to thereby form third digital receive-focused signals.

The ultrasound data forming section 240 may be configured to form ultrasound data based on the digital receive-focused signals provided from the beam former 230. The ultrasound data forming section 240 may further perform signal processing (e.g., gain control, etc) upon the digital receive-focused signals.

In one embodiment, the ultrasound data forming section 240 may form first ultrasound data corresponding to the first ultrasound image $F_1$ as shown in FIG. 3 based on the first digital receive-focused signals provided from the beam former 230. The ultrasound data forming section 240 may further form second ultrasound data corresponding to the second ultrasound image $F_2$ as shown in FIG. 3 based on the second digital receive-focused signals provided from the beam former 230. The ultrasound data forming section 240 may further form third ultrasound data corresponding to the third ultrasound image $F_3$ as shown in FIG. 3 based on the third digital receive-focused signals provided from the beam former 230.

Referring back to FIG. 1, the ultrasound system 100 may further include a processing unit 120 in communication with the ultrasound data acquisition unit 110.

Figure 4:
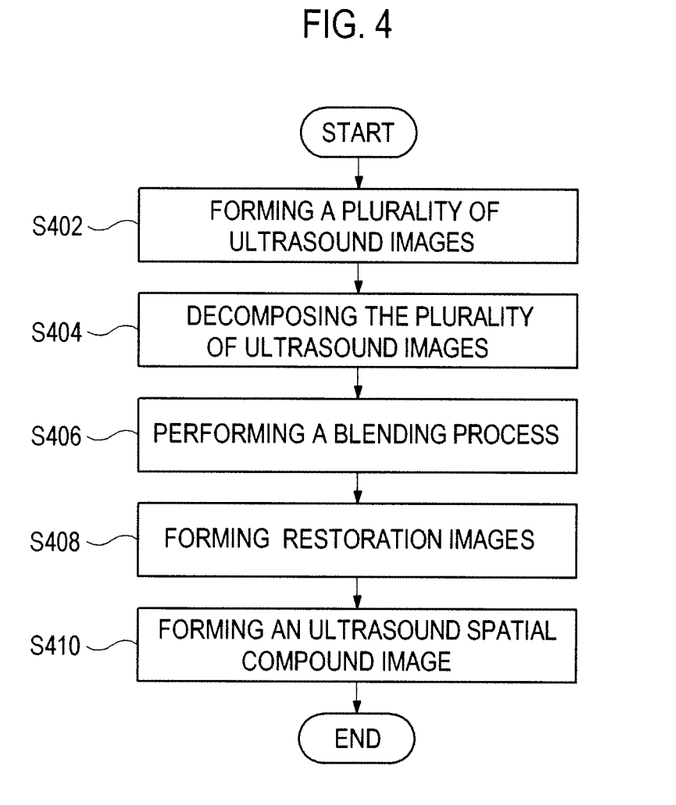
FIG. 4 is a flow chart showing a process of forming an ultrasound spatial compound image.

FIG. 4 is a flow chart showing a process of forming an ultrasound spatial compound image. The processing unit 120, as shown in FIG. 1, may be configured to form the plurality of ultrasound images based on the plurality of ultrasound data provided from the ultrasound data acquisition unit 110, at step S402.

In one embodiment, the processing unit 120 may form the first ultrasound image $F_1$ as shown in FIG. 3 based on the first ultrasound data provided from the ultrasound data acquisition unit 110. The processing unit 120 may further form the second ultrasound image $F_2$ as shown in FIG. 3 based on the second ultrasound data provided from the ultrasound data acquisition unit 110. The processing unit 120 may further form a third ultrasound image $F_3$ as shown in FIG. 3 based on the third ultrasound data provided from the ultrasound data acquisition unit 110.

The processing unit 120 may be configured to decompose each of the ultrasound images into a low pass image having a low frequency component and a high pass image having a high frequency component, at step S404.

The processing unit 120 may decompose each of the ultrasound images into the low pass image and the high pass image by using a low pass filter as following equation.

$$I_L = I*G, \quad I_H = I - I_L \tag{1}$$

I represents the ultrasound image, $I_L$ represents the low pass image, $I_H$ represents the high pass image, * represents convolution, and G represents the low pass filter. The low pass filter may include two-dimensional Gaussian filter. However, it should be noted herein that the low pass filter may be not limited thereto.

Figure 5:
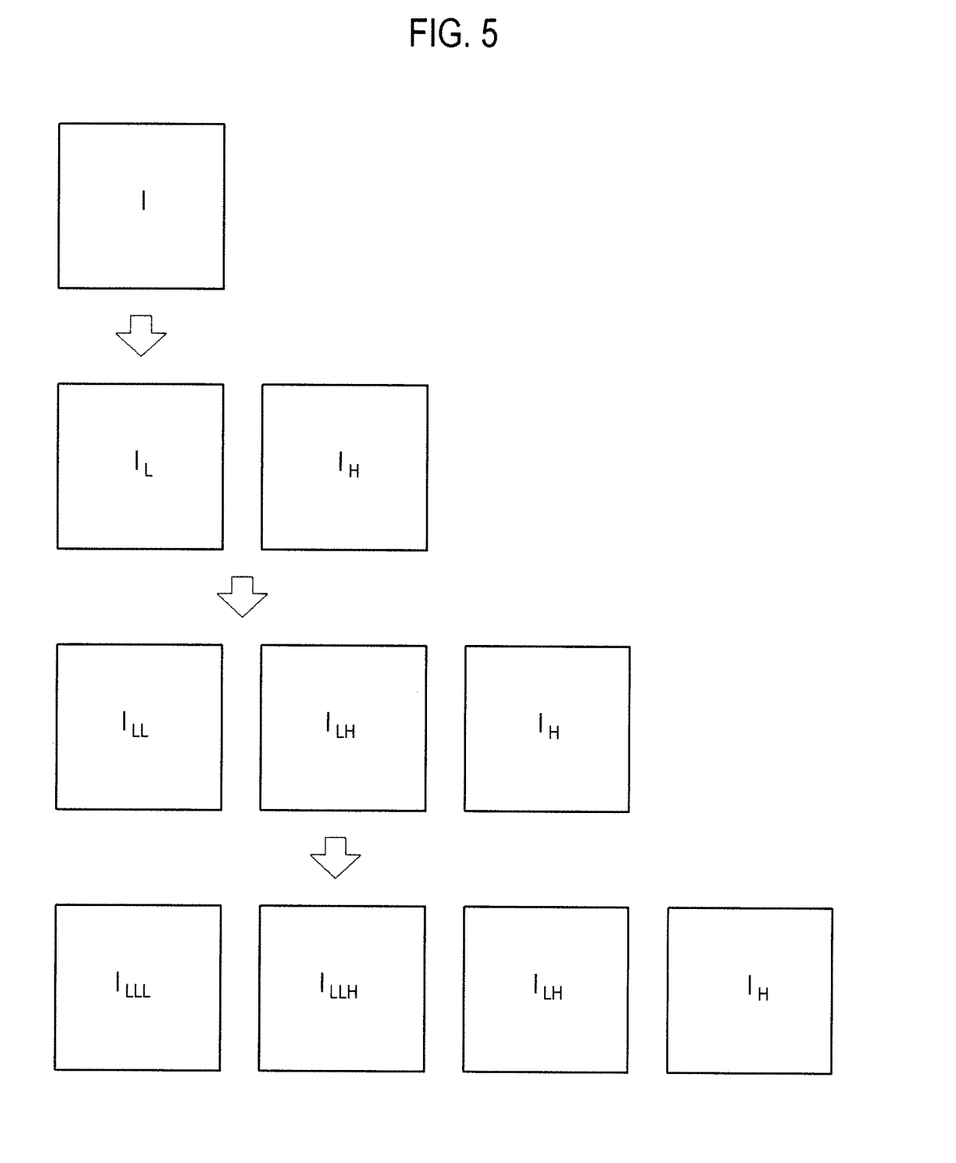
FIG. 5 is a schematic diagram showing an example of decomposing an ultrasound image into an N-level low pass image and an N-level high pass image.

FIG. 5 is a schematic diagram showing an example of decomposing an ultrasound image into an N (N≥2)-level low pass image and an N-level high pass image. In another embodiment, the processing unit 120 may decompose each of the ultrasound images I into a first-level low pass image $I_L$ and a first-level high pass image $I_H$ by using a first low pass filter. The processing unit 120 may further decompose the first-level low pass image $I_L$ into a second-level low pass image $I_{LL}$ and a second-level high pass image $I_{LH}$ by using a second low pass filter. A cutoff frequency of the second low pass filter is lower than that of the first low pass filter. The processing unit 120 may further decompose the second-level low pass image $I_{LL}$ into a third-level low pass image $I_{LLL}$ and a third-level high pass image $I_{LLH}$ by using a third low pass filter. The cutoff frequency of the third low pass filter is lower than that of the second low pass filter.

Referring back to FIG. 4, the processing unit 120 may be configured to perform a blending process upon the decomposed low pass image and high pass image for each of the ultrasound, at step S406. The blending process may include an alpha-blending process. However, it should be noted herein that the blending process may be not limited thereto.

More particularly, the processing unit 120 may detect boundary lines of the low pass images corresponding to the plurality of ultrasound images. The processing unit 120 may detect boundary lines of the high pass images corresponding to the plurality of ultrasound images. The processing unit 120 may further set blending areas having a predetermined size on the low pass images and the high pass images based on the detected boundary lines. The processing unit 120 may further perform the blending process upon the low pass images and the high pass images based on the blending areas.

Figure 6:
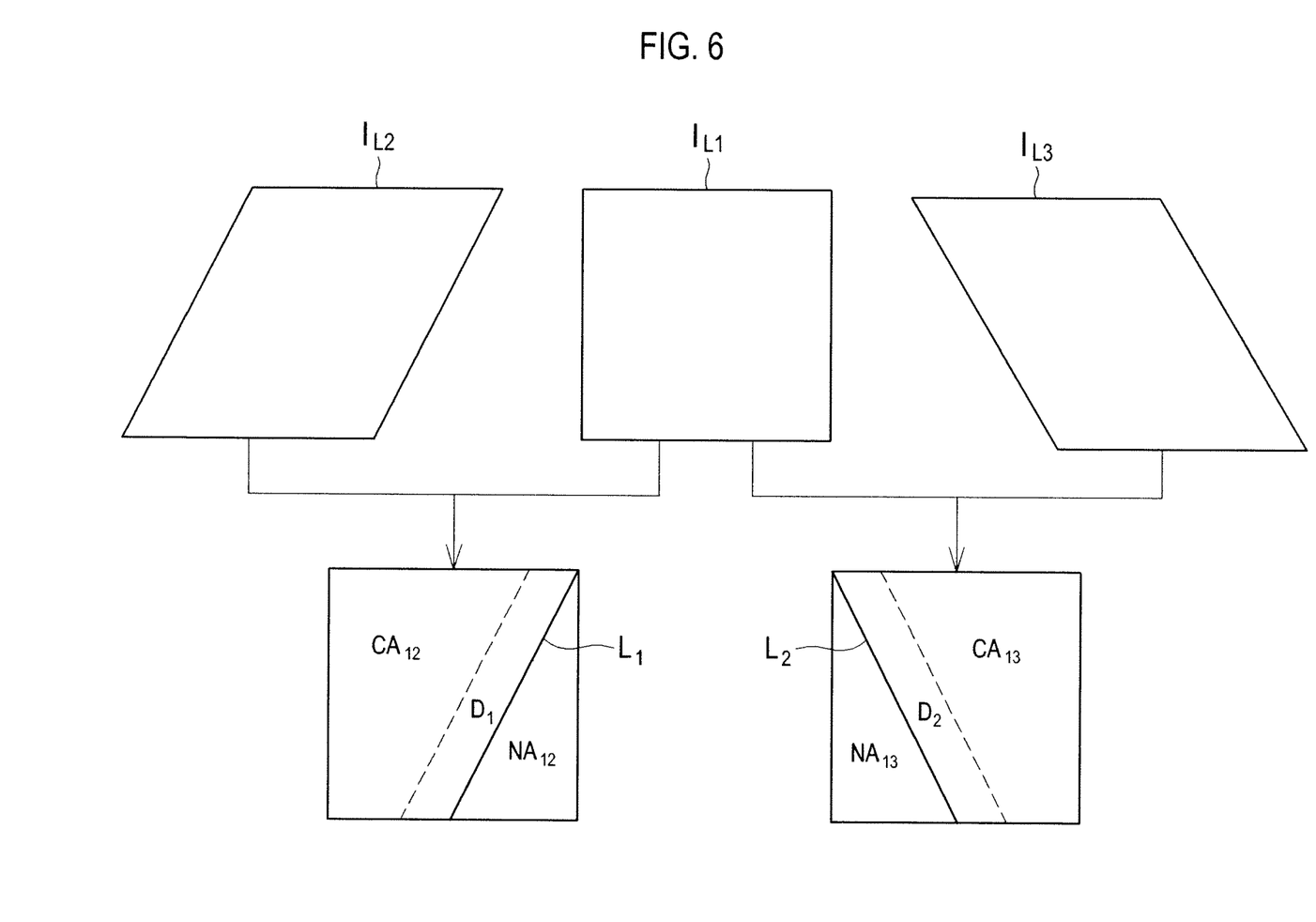
FIG. 6 is a schematic diagram showing an example of a plurality of low pass images corresponding to the plurality of ultrasound images, boundary areas and blending areas.

Referring to FIG. 6, the processing unit 120 may detect a boundary line $L_1$ of the low pass image $I_{L1}$ corresponding to the first ultrasound image $F_1$ as shown in FIG. 3 and the low pass image $I_{L2}$ corresponding to the second ultrasound image $F_2$ as shown in FIG. 3. The processing unit 120 may further set a blending area $D_1$ having the predetermined size on the low pass image $I_{L1}$ and the low pass image $I_{L2}$ based on the boundary line $L_1$. The processing unit 120 may further perform the blending process upon the low pass image $I_{L1}$ and the low pass image $I_{L2}$ for applying a first weight value a1 to pixels of the blending area $D_1$ adjacent to an area $NA_{12}$ and applying a second weight value (a2=1−a1) to pixels of the blending area $D_1$ adjacent to an area $CA_{12}$. The area $NA_{12}$ may be a non-overlapped area of the low pass image $I_{L1}$ and the low pass image $I_{L2}$. In addition, the area $CA_{12}$ may be an overlapped area of the low pass image $I_{L1}$ and the low pass image $I_{L2}$. That is, the weight value, which may be applied to the blending area $D_1$, may vary from a1 to a2, as going from a boundary of the area $NA_{12}$ and the blending area $D_1$ and a boundary of the area $CA_{12}$ and the blending area $D_1$. As shown in FIG. 6, the processing unit 120 may further detect a boundary line $L_2$ of the low pass image $I_{L1}$ corresponding to the first ultrasound image $F_1$ as shown in FIG. 3 and the low pass image $I_{L3}$ corresponding to the third ultrasound image $F_3$ as shown in FIG. 3. The processing unit 120 may further set a blending area $D_2$ having the predetermined size on the low pass image $I_{L1}$ and the low pass image $I_{L3}$ based on the boundary line $L_2$. The processing unit 120 may further the blending process upon the low pass image $I_{L1}$ and the low pass image $I_{L3}$ for applying the first weight value a1 to pixels of the blending area $D_2$ adjacent to an area $NA_{13}$ and applying the second weight value (a2=1−a1) to pixels of the blending area $D_2$ adjacent to an area $CA_{13}$. The area $NA_{13}$ may be a non-overlapped area of the low pass image $I_{L1}$ and the low pass image $I_{L3}$. Further, the area $CA_{13}$ may be an overlapped area of the low pass image $I_{L1}$ and the low pass image $I_{L3}$. The processing unit 120 may perform the blending process upon the high pass images corresponding to the ultrasound images $F_1$ to $F_3$ as mentioned above.

The processing unit 120 may be configured to compose the blended low pass images and high pass images to thereby form a plurality of restoration images corresponding to the plurality of ultrasound images at step S408 in FIG. 4.

In one embodiment, the processing unit 120 may compose the blended low pass image and high pass image corresponding to the first ultrasound image $F_1$ as shown in FIG. 3 to thereby form a first restoration image corresponding to the first ultrasound image $F_1$. The processing unit 120 may further compose the blended low pass image and high pass image corresponding to the second ultrasound image $F_2$ as shown in FIG. 3 to thereby form a second restoration image corresponding to the second ultrasound image $F_2$. The processing unit 120 may further compose the blended low pass image and high pass image corresponding to the third ultrasound image $F_3$ as shown in FIG. 3 to thereby form a third restoration image corresponding to the third ultrasound image $F_3$.

The processing unit 120 may be configured to perform spatial compound imaging upon the plurality of restoration images to thereby form an ultrasound spatial compound image at step S410. The methods of performing the spatial compound imaging are well known in the art. Thus, they have not been described in detail so as not to unnecessarily obscure the present invention. In one embodiment, the processing unit 120 may perform the spatial compound imaging upon the first restoration image, the second restoration image and the third restoration image to thereby form the ultrasound spatial compound image.

Referring back to FIG. 1, the ultrasound system may further include a storage unit 130. The storage unit 130 may store the ultrasound data acquired by the ultrasound data acquisition unit 110. The storage unit 130 may further store the plurality of ultrasound images formed by the processing unit 120.

The ultrasound system may further include a display unit 140. The display unit 140 may display the ultrasound spatial compound image formed by the processing unit 120. The display unit 140 may further display the plurality of ultrasound images formed by the processing unit 120.

In another embodiment, the present invention may provide a computer readable medium comprising computer executable instructions configured to perform following acts: a) acquiring a plurality of ultrasound data for obtaining a plurality of ultrasound images corresponding to a plurality of steering angles; b) forming the plurality of ultrasound image based on the plurality of ultrasound data; c) decomposing each of the plurality of ultrasound images into a low pass image having a low frequency component and a high pass image having a high frequency component; d) performing a blending process for removing a seam artifact upon the low pass image and the high pass image for each of the plurality of ultrasound images; and e) form an ultrasound spatial compound image based on the blended low pass image and high pass image. The computer readable medium may comprise a floppy disk, a hard disk, a memory, a compact disk, a digital video disk, etc.

Although embodiments have been described with reference to a number of illustrative embodiments thereof, it should be understood that numerous other modifications and embodiments can be devised by those skilled in the art that will fall within the spirit and scope of the principles of this disclosure. More particularly, numerous variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. An ultrasound system, comprising:
   an ultrasound data acquisition unit configured to transmit and receive ultrasound signals to and from a target object based on a plurality of steering angles to thereby output a plurality of ultrasound data for obtaining a plurality of ultrasound images corresponding to the steering angles; and
   a processing unit in communication with the ultrasound data acquisition unit, the processing unit being configured to form the ultrasound images based on the ultrasound data, decompose each of the ultrasound images into a low pass image having a low frequency component and a high pass image having a high frequency component, perform a blending process for removing a seam artifact upon the low pass image and the high pass image corresponding to each of the ultrasound images, form a plurality of restoration images by composing the blending-processed low and high pass images corresponding to each of the ultrasound images, and form an ultrasound spatial compound image based on the restoration images,
   wherein the processing unit is configured to perform the blending process upon the low pass image or the high pass image of one of the plurality of ultrasound images with the low pass image or the high pass image, respectively, of another one of the plurality of ultrasound images.

2. The ultrasound system of claim 1, wherein the processing unit is configured to decompose each of the ultrasound images into the low pass image and the high pass image by using a low pass filter.

3. The ultrasound system of claim 1, wherein the processing unit is configured to:
   detect first boundary lines of the low pass images and second boundary lines of the high pass images;
   set first blending area having a predetermined size on the low pass images based on the first boundary lines and second blending areas having the predetermined size on the high pass images based on the second boundary lines; and
   perform the blending process upon the low pass images and the high pass images based on the first blending areas and the second blending areas.

4. The ultrasound system of claim 3, wherein the processing unit is configured to perform the blending process by applying a first weight value to pixels of the first blending areas adjacent to a non-overlapped area of the low pass images, applying a second weight value to pixels of the first blending areas adjacent to an overlapped area of the low pass images, applying the first weight value to pixels of the second blending areas adjacent to a non-overlapped area of the high pass images, and applying the second weight value to pixels of the second blending areas adjacent to an overlapped area of the high pass images.

5. The ultrasound system of claim 1, wherein the blending process comprises an alpha blending process.

6. A method of providing an ultrasound spatial compound image, comprising:
   a) forming a plurality of ultrasound images based on a plurality of ultrasound data, wherein the ultrasound images correspond to a plurality of steering angles;
   b) decomposing each of the ultrasound images into a low pass image having a low frequency component and a high pass image having a high frequency component;
   c) performing a blending process for removing a seam artifact upon the low pass image and the high pass image corresponding to each of the ultrasound images;
   d) forming a plurality of restoration images by composing the blending-processed low and high pass images corresponding to each of the ultrasound images; and
   e) forming an ultrasound spatial compound image based on the restoration images,
   wherein the blending process is performed upon the low pass image or the high pass image of one of the plurality of ultrasound images with the low pass image or the high pass image, respectively, of another one of the plurality of ultrasound images.

7. The method of claim 6, wherein the step b) comprises:
   decomposing each of the ultrasound images by using a low pass filter.

8. The method of claim 6, wherein the step c) comprises:
   c1) detecting first boundary lines of the low pass images and second boundary lines of the high pass images;
   c2) setting first blending areas on the low pass images based on the first boundary lines and second blending areas on the high pass images based on the second boundary lines; and
   c3) performing the blending process upon the low pass images and the high pass images based on the first blending areas and the second blending areas.

9. The method of claim 8, wherein the step c3) comprises:
   applying a first weight value to pixels of the first blending areas adjacent to a non-overlapped area of the low pass images;
   applying a second weight value to pixels of the first blending areas adjacent to an overlapped area of the low pass images;
   applying the first weight value to pixels of the second blending areas adjacent to a non-overlapped area of the high pass images; and
   applying the second weight value to pixels of the second blending areas adjacent to an overlapped area of the high pass images.

10. The method of claim 6, wherein the blending process comprises an alpha blending process.

11. A non-transitory computer readable medium comprising computer executable instructions for performing following steps of:
    a) forming a plurality of ultrasound images based on a plurality of ultrasound data, wherein the ultrasound images corresponding to a plurality of steering angles;
    b) decomposing each of the ultrasound images into a low pass image having a low frequency component and a high pass image having a high frequency component;
    c) performing a blending process for removing a seam artifact upon the low pass image and the high pass image corresponding to each of the ultrasound images;
    d) forming a plurality of restoration images by composing the blending-processed low and high pass images; and
    e) forming an ultrasound spatial compound image based on the restoration images,
    wherein the blending process is performed upon the low pass image or the high pass image of one of the plurality of ultrasound images with the low pass image or the high pass image, respectively, of another one of the plurality of ultrasound images.

* * * * *